(12) United States Patent
Pereira

(10) Patent No.: US 8,818,586 B2
(45) Date of Patent: Aug. 26, 2014

(54) PROTECTION SYSTEM FOR SHIP LOADING

(76) Inventor: Gustavo Possas Pereira, Curitiba (BR)

(*) Notice: Subject to any disclaimer, the term of this patent is extended or adjusted under 35 U.S.C. 154(b) by 0 days.

(21) Appl. No.: 13/532,048

(22) Filed: Jun. 25, 2012

(65) Prior Publication Data

US 2013/0317677 A1    Nov. 28, 2013

(30) Foreign Application Priority Data

May 28, 2012    (BR) .......................... 202012012772 U

(51) Int. Cl.
*B63B 19/14*    (2006.01)

(52) U.S. Cl.
USPC ........................................ 701/21; 114/201 R

(58) Field of Classification Search
CPC .......... B63B 27/00; B63B 27/36; B63B 25/02
USPC .................. 701/21; 700/213; 414/137.4, 291, 414/137.1–143.2; 114/201 R, 361, 364, 202, 114/203, 201 A; 193/3; 222/328, 526, 527, 222/523, 533; 212/290, 276; 221/9
See application file for complete search history.

(56) References Cited

U.S. PATENT DOCUMENTS

| | | | | |
|---|---|---|---|---|
| 5,427,491 A | * | 6/1995 | Duffy et al. | .................... 414/291 |
| 5,778,815 A | * | 7/1998 | Shields et al. | ............ 114/201 R |
| 5,931,111 A | * | 8/1999 | Shields et al. | ............ 114/201 R |

FOREIGN PATENT DOCUMENTS

| | | |
|---|---|---|
| BR | PI0500639 A | 10/2006 |
| EP | 0 413 131 A1 | 2/1991 |
| GB | 2 125 345 A | 3/1984 |
| JP | 11-029091 A | 2/1999 |
| JP | 2002-302092 A | 10/2002 |
| JP | 2004-051073 A | 2/2004 |
| JP | 2005-104241 A | 4/2005 |

OTHER PUBLICATIONS

Etec, "Ship Raincoat," Sep. 20, 2008, <http://www.etecsa.com.br/principal_ingles.htm>—pdf attached.*
iSAM AG, "Automation of Grab Ship Unloaders (GSU) for Bulk Materials," Jan. 20, 2012, <http://www.isam-ag.com/media/raw/EN_Applik_Report_Grab_Unloader.pdf>—pdf attached.*

* cited by examiner

*Primary Examiner* — Helal A Algahaim
*Assistant Examiner* — Genna Mott
(74) *Attorney, Agent, or Firm* — Buchanan Ingersoll & Rooney PC

(57) ABSTRACT

Protection system for ship loading provided with a cover device comprising a universal adaptable cover, a coupling and operation device comprising a ring structure that houses the elements necessary for operation of the protection system, such as the fixing device, tractor assembly responsible for handling, lowering and collapsing the protection cover and its system of monitoring of the load, which, together, allow a new approach in the protection of loading of ships.

5 Claims, 7 Drawing Sheets

PROTECTION SYSTEM FOR SHIP LOADING

FIELD OF THE EMBODIMENT

The present innovation belongs to the field of transportation, more specifically performance equipments, especially applied to vessels and related equipments, and exactly a protection system for ship's cargo, allowing continuous operation.

BACKGROUND OF THE INNOVATION AND ANALYSIS OF THE STATE OF THE ART

The practice of ships loading in ports depends largely on weather conditions for their safe execution. It implies that on days of inclement weather such as rain or high winds, the loading operation is compromised, as these conditions may alter the characteristics of the load or generate severe security risks during the idealization of the load.

Based on this scenario, several initiatives to generate some protection to the load and operation were developed, focusing on covering the opening of the basement and its connection with the feed loader tube to be introduced and allocated in the basement of the ship.

In a detailed observation of the methodologies used in the loading of ships, it was noted that the use of a retractable system, capable of locking up the basement of the ship, would allow the shipment of goods, especially bulk, even in unfavorable environmental conditions, especially in respect to weather and winds. It was also noted that this system would be able to avoid the dispersion of particulates resulting from the loading of bulk cargoes at the port terminal, resulting in reduction of operating losses, arising from environmental contamination of this dispersion and the incidence of birds and rodents.

Thus, this device provides comprehensive solutions in the field of maritime transport, since, by allowing the shipment of goods within the basements of the vessel, particularly bulk, regardless of weather conditions, it decreases congestion of ships awaiting berthing, so as to expedite the transport of both goods destined for Cargo Ships, and the ones intended for Modular Load Ships (carrying goods packaged in containers). In-depth analysis of the state of the art, it is noted that the patent PI0500639 is characterized by protecting the products to be unloaded or loaded on ships, regardless of their nature, which is stored or deposited in the cargo holds of the respective vessels moored at the port for this purpose. It constitutes a metal support and a layer of waterproof material which moves together with the discharge tube up and down according to operator control via the hoisting ropes, which can wind and unwind the sides of the same material, protecting against the weather when necessary, thus avoiding product waste, either by rain or any other damage caused by external agents. However this patent shows a different constructive embodiment.

The document PI9910043 presents a vessel hatch cover of an impervious laminated material that covers the hatch of a vessel in order to allow the loading of bulky materials during bad weather while protecting the load from potential damage or damage caused by rainwater or other contaminants. The vessel hatch cover includes a structure or superstructure covering the open hatch of a ship. A flexible lightweight sheet material impervious to water and stretched over the structure to prevent any moisture or other contaminants from entering the hold of the vessel while the vessel cover is in place. However this document provides a different constructive embodiment.

The protection JP2005104241 shows a cover that when the rain begins on the outer surface of a hull, respective tilting arms are connected with the respective vertical pole and are inclined and elongated by means of a control panel so as to adjust to the size and geometry of the hull. Thus a support arm is brought against the side of the hull, so that a covering layer forms a space between the wall and the dock side of the shell to be covered. The protective has a side cover of ships moving away from the characteristics presented by the innovation that is proposed herein.

The patent JP2004051073 shows a U-shaped elastic member fitted on both faces or one face of an opening in an upper end plate with adhesive materials or the alike. The patent describes only ships hatch covers, moving away from the peculiarities presented by said innovation.

The document JP2002302092 discloses a frame that has a size able to work around a hatch supported horizontally by a mainstay of wharf. A foldable type raincoat is released within the frame, and is opened and closed over the width of the vessel by a motor through a chain. The cover can be regulated in width direction of the vessel and also suspended. A lifting hook is provided in the frame and a device for prevention of precipitation is loaded into and out of the loading vase. The object thereof does not have the same constructive embodiment, not colliding with the peculiarities shown by the proposed innovation.

The protection JP11029091 has a quayside facility for cargo handling provided with a crane for the discharge between quay and ship, and is equipped with a hatch having a cover that can be closed and a removable load suspended cover, provided with hook for suspending the crane load. The hatch cover is a cover receiver for mounting the suspended load cover. Such protection does not have the same constructive embodiments, moving away from the characteristics revealed by the aforementioned innovation.

The patent EP0413131 discloses a protection against rain for vertical conveyors, in particular to vessels covers in which sections of the cover are connected to the vertical transport and can be opened and closed in like an umbrella. The cover sections are disposed in relation to the vertical transport, so that an inverted umbrella is formed, that is, the lower edges of the individual cover sections are connected to the barrel of the vertical conveyor, while the boundary edges above can be folded outwards and towards the vertical conveyor tube. This document deviates from the desired characteristics of innovation for not showing the same constructive embodiments.

The document GB2125345 shows a conveyor, such as a helical ramp or the like having sideway rain cover sections raised and tied by strings. The sections are similar to an umbrella, and are connected to at least three ropes transport connected to a rope reel which is mounted on the conveyor so that the vertical side sections of the cover can be raised and lowered. The sections are coupled to a symmetrical and conical center over a bushing mounted on the vertical conveyor and are vertically movable by means of roller bearings. The roof is associated with the hatch of a vessel. The patent does not provide the same solution as the proposed ship loader.

In summary, what appears in the art does not solve the problems relating to the containment of suspended particulate matter which are generated during loading, especially of bulk in ships. Neither addresses the port ineffectiveness because of bad weather and, finally, does not prevent entry of birds and other contaminants within the holds of ships.

Based on these facts and considering the continuing development of products, we propose an innovation, now claiming the privileges of its protection for its novelty and inventive activity, as explained below. Therefore, the present innovation is a protection system for ships loading provided with a covering device, comprising a universal adaptable cover to any size of the hold, regardless of its opening being provided horizontal or vertically, associated with a coupling and operation device, consisting of a ring structure that houses the fastener, a mount responsible for moving tractor, descent and gathering the protection cover, and a monitoring system of loading, capable of generating the perception and visualization of the charge level within the compartment loaded.

In alternative embodiments, such protection system allows for radial movement of bulk scattering inside the ship's holds and use of a pivoting mechanism that compensates the displacements of the ship loader in order to avoid deformation of the protective cover and possible damage to the supporting structure.

The innovation brings as main advantages: (i) the improvement of environmental port conditions due to enclosure of the ship's hold during load time, preventing the dispersion of particles, (ii) provide conditions for operating the loading during days of bad weather; (iii) streamline the procedures for loading, allowing for uninterrupted operation. As a consequence, one can predict that the use of this protection system for ship loading will facilitate the reduction of congestion of ships awaiting berths, will act by preventing access of birds and contaminants in the environment of the load, will collaborate in the reduction of waste products shipped due to the enclosed supply, will help to reduce operating costs and reduction of maintenance caused by particulate contamination, providing thus less impact on the environment, indirectly helping to reduce contractual fines and allowing the reduction of storage costs.

DETAILED DESCRIPTION OF THE INNOVATION

Figure 1:
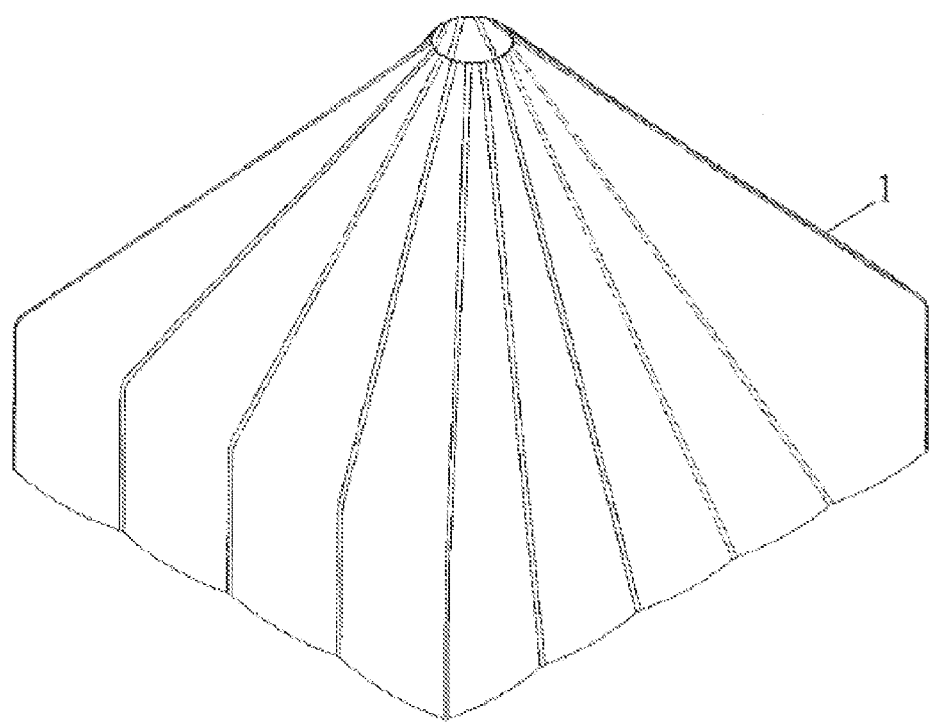
FIG. 1 shows a perspective view of the cover device (1) when in use, translated into a universal cover adaptable to any size of the hold. The presence of the cover sections is noted, delimited by the lines of separation channels formed by the passage of cables between two layers of fabric.
Figure 2:
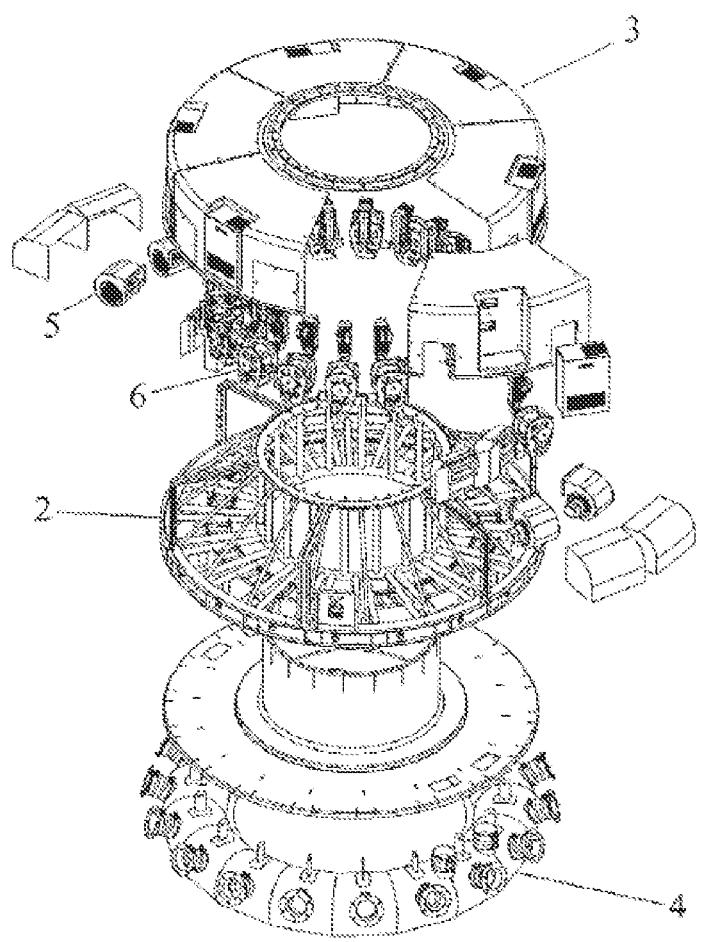
FIG. 2 shows an exploded view of the coupling and operation device (9), where the ring-shaped internal structure (2) is noted, supporting the elements of the device, such as the outer covering (3), the air distribution ring tube (4), the air blowers (5) and the tractors (6) for cables.
Figure 3:
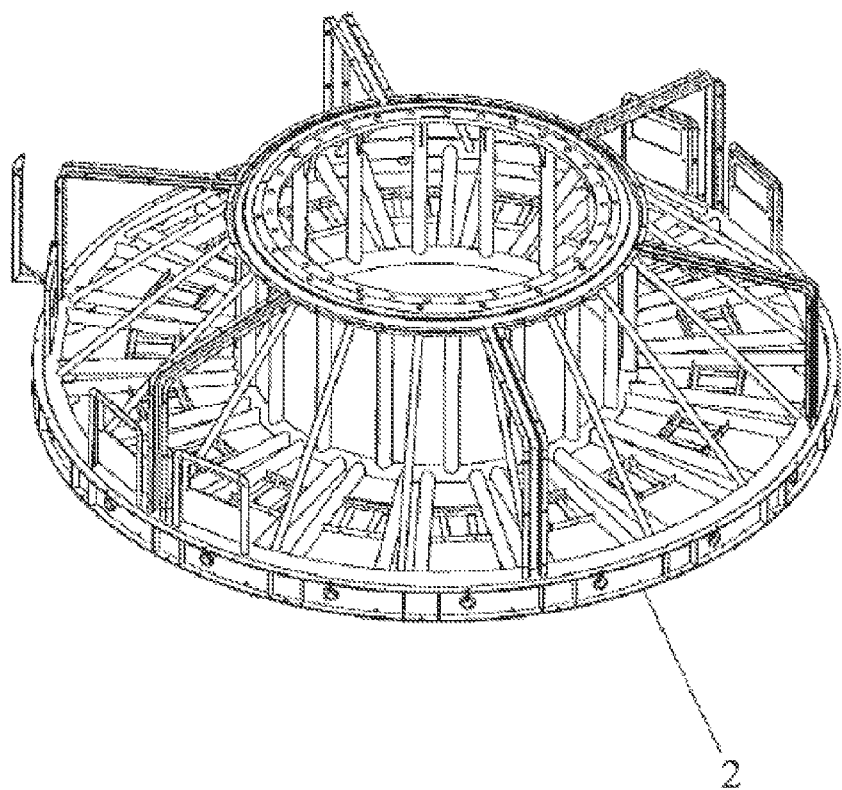
FIG. 3 illustrates the ring-shaped internal structure (2), where the central span is noted, through where the material flows to be loaded into the vessel and the outer horizontal platform, which supports the various components of the coupling device and operation required for providing all its functional features.
Figure 4:
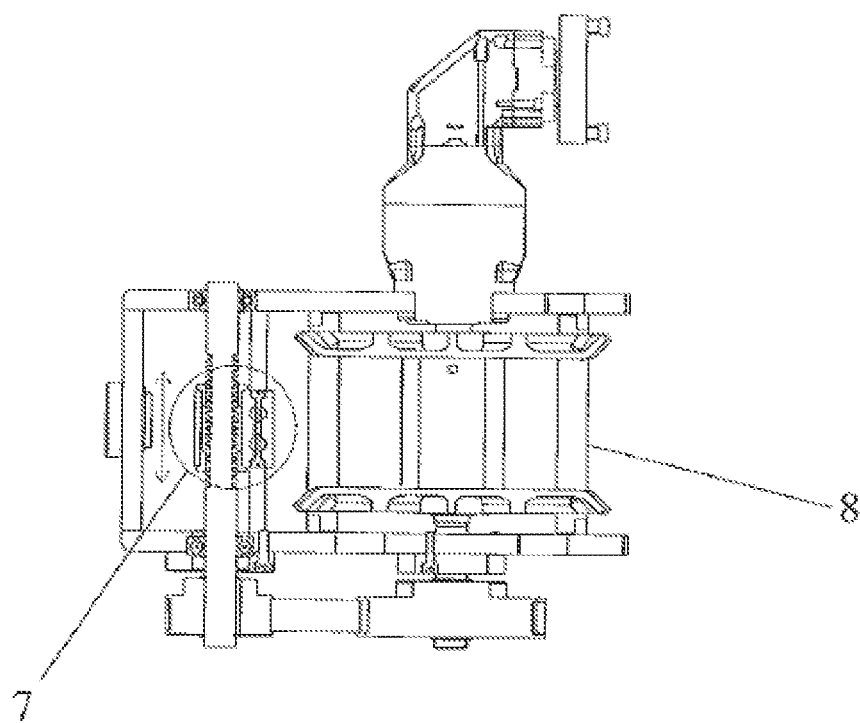
FIG. 4 presents a tractor (6), where there is, in detail, the organization device (7) for storage of cables in the reel (8), and said organization device (7) moving laterally alternately, providing alignment of the cables in the reel (8) and thus preventing their tangling, which could lead to wire breaks and the consequent disruption of the protective cover (1).
Figure 5:
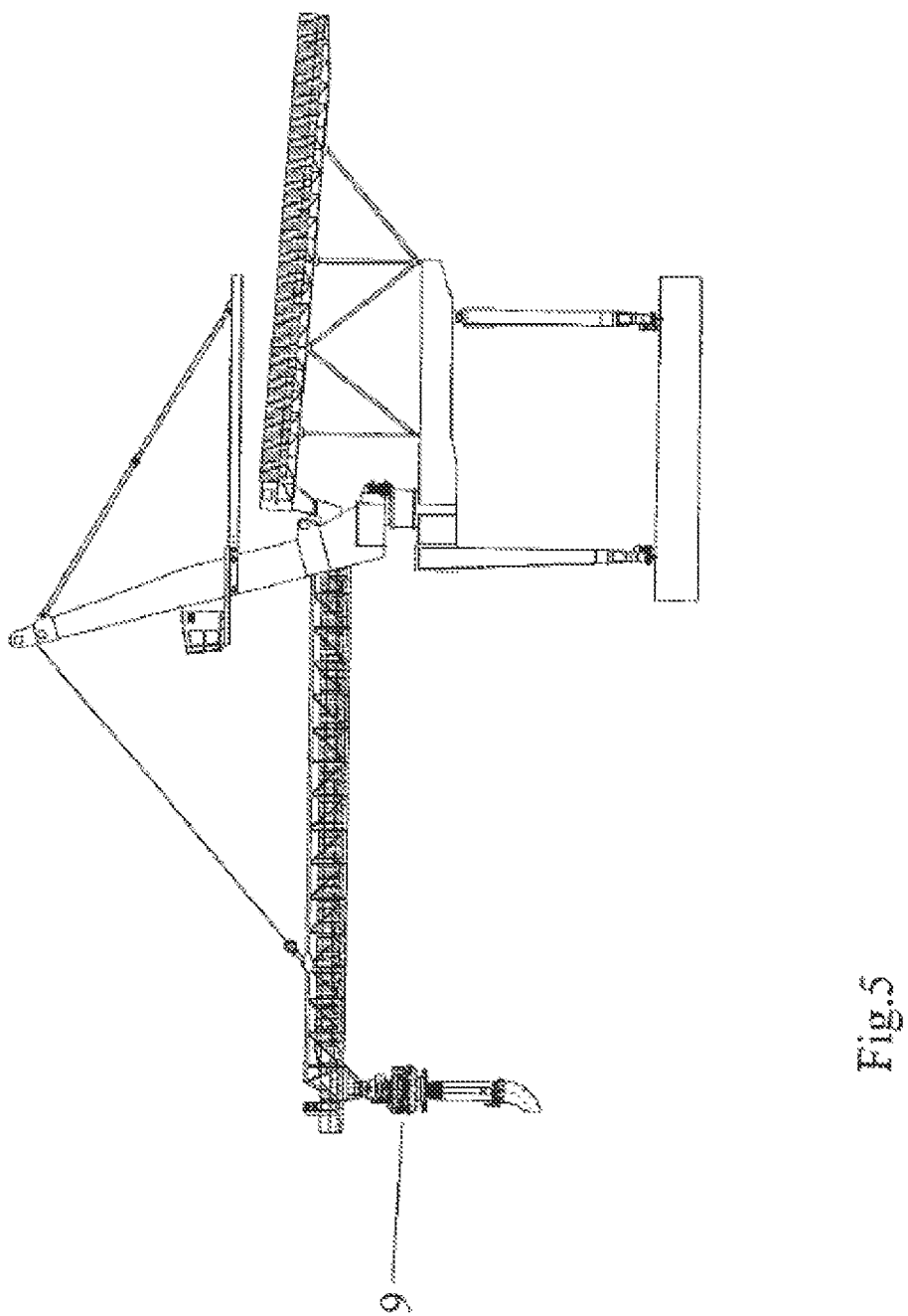
FIG. 5 shows an illustrative view of the coupling and operation device (9) in its use position, coupled to the port equipment for cargo handling and vessels loading.
Figure 6:
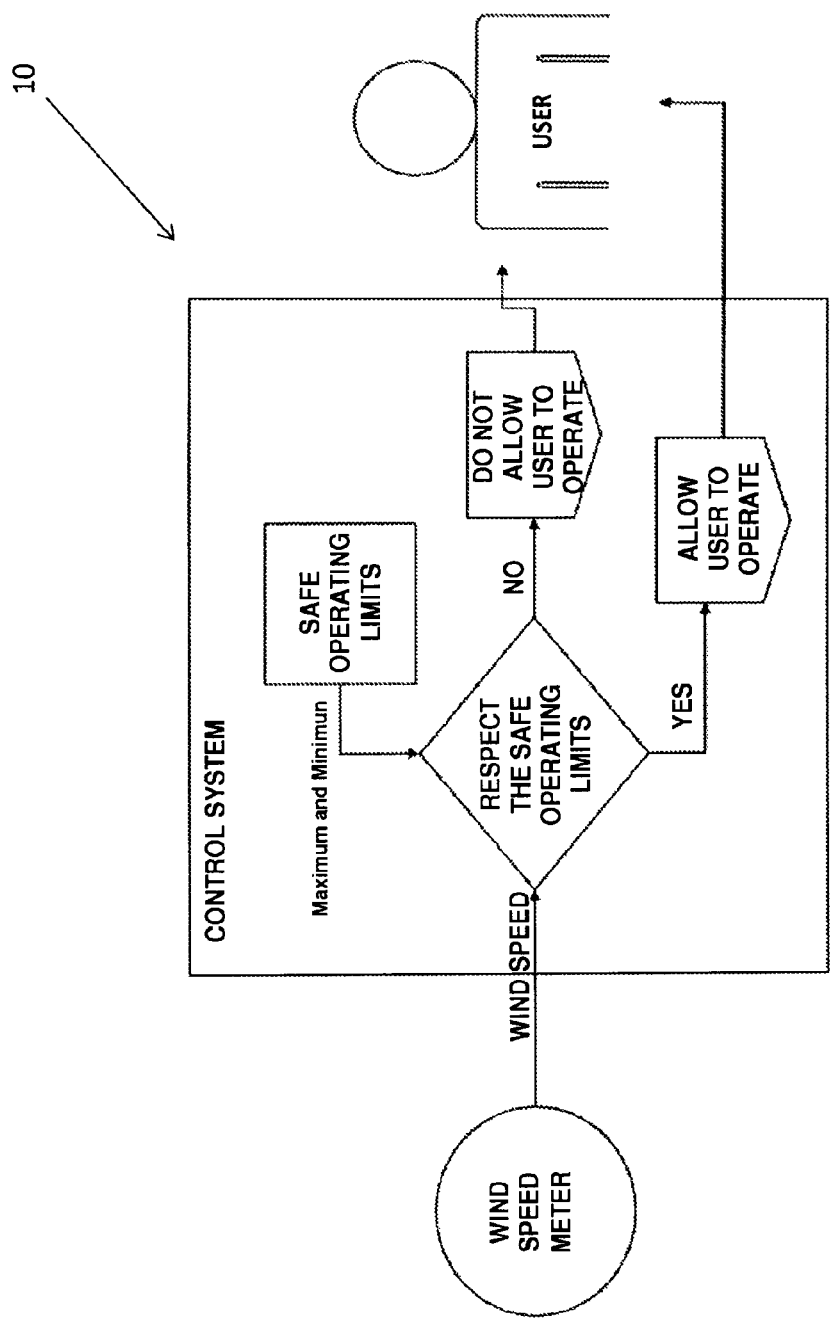
FIG. 6 illustrates a safety system for the cover device (1).
Figure 7:
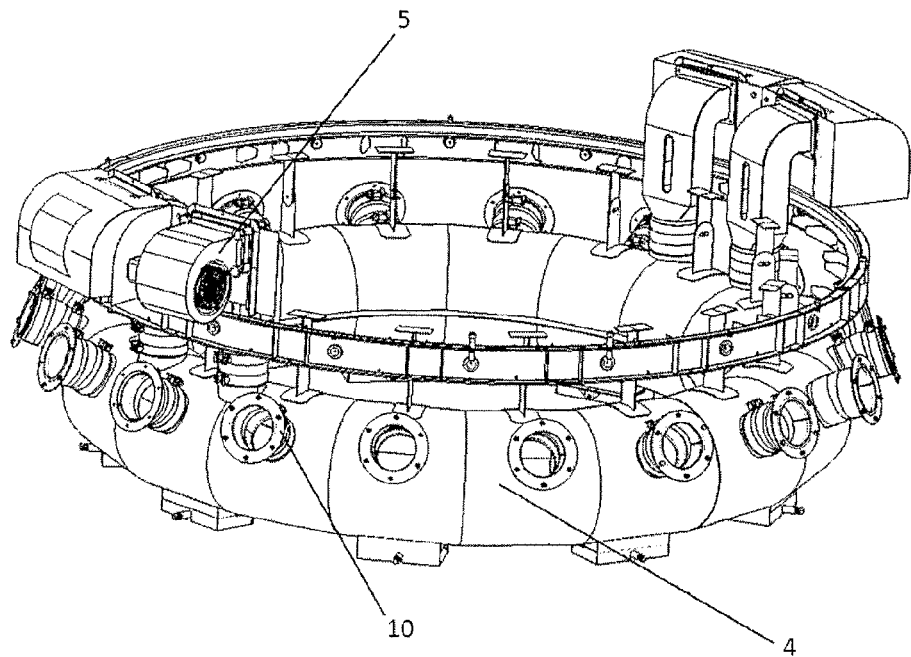
FIG. 7 illustrates in greater detail the annular air distribution tube (4), showing the allocation of air blowers (5) and the connecting flange (10) that direct airflow to the inside of the channels of the protective cover.
Figure 8:
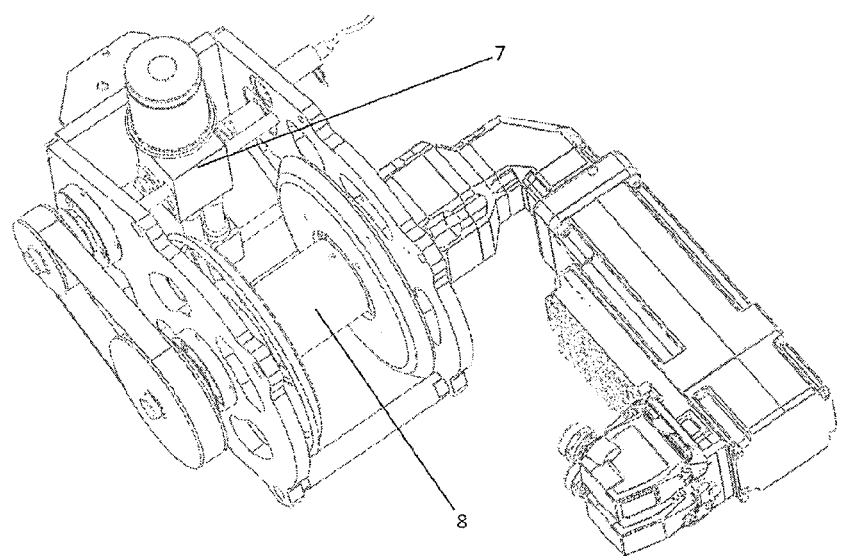
FIG. 8 illustrates in greater detail a tractor (6), the organization device (7) for storage of cables on spool (8).

Faced with the shortcomings presented in the art, it is proposed, as an innovation, a protection system for the loading of ships, having the following constructive embodiment:

With reference to FIG. 1, cover device (1) includes a universal cover adaptable to any size holds of ships, supported by cables, preferably composed of polymeric ship material. This cover is manufactured with two layers of fabric, with an inner layer made of waterproof fabric, provided with carbon wires in their frames for discharging static electricity, and the outer waterproof fabric made of a water-repellent material, preferably treated with polyurethane resin, thereby making it hydrophobic. Both layers are sewn together so as to form sections, which will be blown to prevent bulging of the fabric and consequent accumulation of water intercalated with housings for the support cables of the cover (1). Said sewing is further sealed by a polymeric stripe, preferably polyurethane, which is hot melt, providing the sealing of the seam holes. Such cover, when in operation, is inflated by means of radial fans (5) maintaining the pressure in sections, between the two fabric layers, thereby ensuring the maintenance of the structure, avoiding the accumulation of water, and the cables—enclosed in housings on the cover—serve as channels for water runoff;

A set of guides, karabiner or similar type, which are attached to magnets, known as magnetic lifters, allowing the routing of cables and their attachment to the metal parts of the ship's deck. The set is adaptable to any type of ship's holds, including those with horizontal closing—"Panamax" type—and vertical—"McGregor" type;

A coupling and operation device (9), composed of a structure called "ring" (2), preferably steel, with anti-corrosion, which packages the fixtures and fittings required for the setting and operation of the protection system for loading ship. Such ring (2) is equipped with a motorized rotating roller bearing, and the head rotates around its axis to keep the orientation of the cover. The motor induces movement and the roller bearing enables displacement. In an alternative embodiment, the coupling and device operation (9) is provided with bearing allowing the free motion of torsion preserving the boom structure of the loader;

A set of tractors (6), responsible for movement (descent and collapse) of the protective cover (1). The tractor (6) is formed by the association of an explosion-proof electric motor, a gearbox, a lubricated rope spreader assembly (7), reel (8) where the cables are packed, and a fault diagnostic system, which has its own logic and inductive sensor, and is best understood when accompanied by FIG. 4. The tractor (6) is responsible for the continuous tensioning of the cables being controlled by an electronic system that monitors the voltage supported by each of the individual cables, allowing the drive of the tractor (6) so as to collect and release the cable to maintain the desired voltage;

A system (11) for monitoring and controlling the level of the cargo loaded, developed in order to allow the operator to view the disposition of the cargo within the hold of the vessel during the loading process, even under the action of intense dusty clouds. The respective data are collected by a camera capturing tridimensional images, for example, by means of laser, and these data are transmitted to the control station interface (12) equipment. The MMI, man-machine interface (12), is a control system equipped with an industrial computer, whereby the operator controls all operations of climb, descent and movement of the cover (1) of the protective device for ship loading. Moreover, the terminal shows, by video, the load distribution within the vessel, in order to enable operator the correct positioning of the loader;

An electrical control system, comprising an electrical panel, in which are installed drives, controls of the servo motors and blowers (5), protective devices, among which we highlight breakers, fuses, power supplies, contactor switches, PLC and electronic control unit of the servo motors. This system operates on each set of tensioning (6) ensuring the homogeneous tension on each cable;

As shown in FIG. 6, a safety system 10 against the action of wind, equipped with an anemometer, whose main purpose is to measure the strength of the wind, and the operational limit of the equipment, which sends information to the manager program, which in turn determines the range in which the equipment can operate, disabling it when wind loads exceed the limits of operation.

The protection system for loading of ships is coupled to the ship, at its upper portion (deck) and also to the loading equipment port by means of flanges bolted directly to the nozzles in lances edges which have no standardized measures, and for this reason, alternatively, may require adjustments, and in its lower portion, through which cables that extend from coupling and operation device (9) and are fastened to the deck of the ship by means of latches preferably magnetic. Thus, the cables are pulled by its own weight and wind loads. Such cable support the universal cover (1) inflated to create a tent like structure, as can be seen in FIG. 1, which isolates the hold of the vessels from the external environment, allowing an enclosed loading. Thus the port loading device is able to move in all directions ensuring the equitable distribution of loading.

The inflating of the cover (1) is made with the aid of air blowers (5) in order to pressurize air in an annular tube (4), whose function is to distribute the pressure in each of the sections of the cover (1).

For the installation of said innovation over the ship's hold, said latches should be automatically released to the specified time, usually above the height of the lid of the hold. From this point, the estimated cable displacement and management are done manually.

For the appropriate removal of the cover, the load is interrupted; a series of valves automatically opens which have the function of exhausting the air accumulated in the pressure shell (1) and closes the ship's hold. The magnetic latches (magnets) are manually withdrawn and then, the cover (1) is automatically retracted into the parking position.

This innovation is not limited to pictorial representations, or commented herein and should be understood in its broad scope. Many modifications and other representations of innovation will come to mind of those skilled in the art to which this innovation belongs, with the benefit of the teachings presented in the foregoing descriptions and drawings. Furthermore, it is to be understood that the innovation is not limited to the specific form disclosed, and modifications and other forms are understood as included within the scope of the appended claims. Although specific terms are employed herein, they are only used in a generic and descriptive purpose and not as limitation.

The invention claimed is:

1. A protection system for ship loading comprising:
a universal cover adaptable to any size of holds of ships, composed of inner and outer layers of naval polymeric material and supported by cables running through said inner and outer layers so as to define a plurality of sections of the cover, said plurality of sections being inflatable by means of air blowers to pressurize air in an annular tube which then delivers the air between the inner and outer layers of each of the sections of the cover;
a set of guides coupled by attachment means, adaptable to metallic parts of the ship's deck to fix the said cables of support;
a coupling and operation device, defined by a ring structure which packages the fixtures and fittings required for the setting and operation of the protection system for loading of ships;
a tractor for handling, lowering and collapsing of said universal cover;
a monitoring and control system for the loading, equipped with a man-machine interface (MMI) which controls all operations of climb, descent and movement of the cover of the protective system for loading of ships;
a safety system against the action of wind, which measures the strength of the wind, and the operational limit of the device and sends the information to management application which, in turn, determines the range in which the equipment can operate;
wherein said protection system for ship loading can be adapted to the openings of the holds of ships through cables that run from the coupling and operation devices and are attached to said openings in the hold of the ship, where said cable is pulled by tractors and still maintain said universal cover inflated.

2. The protection system for ship loading according to claim 1, wherein said protection system is able to move in all directions, ensuring an equitable distribution of voltages along the support cables of the cover.

3. The protection system for ship loading according to claim 1, wherein the set of guides is coupled by magnetic attachment means to metallic parts of the ship's deck.

4. The protection system for ship loading according to claim 1, wherein said ring structure is composed of steel with an anti-corrosion treatment.

5. A protection system for ship loading comprising:
a universal cover including an inner layer and an outer layer of polymeric material and a plurality of cables extending through said inner and outer layers so as to define a plurality of cover sections;
wherein said plurality of cover sections are inflatable when pressurized air is delivered to each of the cover sections between the inner and outer layers of polymeric material; and
wherein said universal cover is adaptable to fit a plurality of ship hold sizes and still maintain said universal cover in an inflated state.

* * * * *